United States Patent [19]

Jeon et al.

[11] Patent Number: 5,548,589
[45] Date of Patent: Aug. 20, 1996

[54] CONNECTIONLESS COMMUNICATION SYSTEM AND METHOD OF CONNECTIONLESS COMMUNICATION

[75] Inventors: Byung C. Jeon; Mi S. Do; Young S. Kim; Chi M. Han, all of Daejeon, Rep. of Korea

[73] Assignee: Electronics and Telecommunications Research Institute, Seoul, Rep. of Korea

[21] Appl. No.: 379,292

[22] Filed: Jan. 27, 1995

[30] Foreign Application Priority Data

Jul. 14, 1994 [KR] Rep. of Korea .................. 1994-17019

[51] Int. Cl.$^6$ ..................................................... H04L 12/56
[52] U.S. Cl. ........................................ 370/60.1; 370/85.3
[58] Field of Search ................................. 370/94.1, 94.2, 370/60, 112, 60.1, 110.1, 85.13

[56] References Cited

U.S. PATENT DOCUMENTS

| | | | |
|---|---|---|---|
| 5,359,600 | 10/1994 | Ueda et al. | 370/44.2 |
| 5,365,524 | 11/1994 | Hiller et al. | 370/94.2 |
| 5,426,636 | 6/1995 | Hiller et al. | 370/94.2 |

FOREIGN PATENT DOCUMENTS

| | | |
|---|---|---|
| 0473066A1 | 3/1992 | European Pat. Off. . |
| 0552385A1 | 7/1993 | European Pat. Off. . |
| 0567711A1 | 11/1993 | European Pat. Off. . |

OTHER PUBLICATIONS

N. Kavak, "LAN interconnection over B-ISDN (ATM)", *Interworking '92*, Swiss, 1992, pp. 1–12.

Akira Chugo et al., "Broadband Communication Network Architecture for distributed computing environments", *IEICE Trans. Comm.*, vol. E77-B, No. 3, Mar. 1994, pp. 343–350.

K. Kerkhof et al., "AAL type 5 to support the broadband connectionless data bearer service", *Interworking '92*, Swiss, 1992, pp. 1–16.

J. Y. Le Boudec et al., "Providing MAC services on an ATM network with point-to-point links", *Interworking '92*, Swiss, 1992, pp. 1–9.

*Primary Examiner*—Douglas W. Olms
*Assistant Examiner*—Dang Ton
*Attorney, Agent, or Firm*—Spencer & Frank

[57] ABSTRACT

A large capacity connectionless communication system and a method of large capacity connectionless communication, capable of achieving an application to both a public network and a private network by centralizing connectionless data in asynchronous transfer mode network and carrying out a routing of the centralized connectionless data by use of a separate connectionless cell switching unit having a rapid connection setup function and a function for maintaining the set-up connection. The connectionless communication system includes terminals each adapted to perform a function of converting a connectionless frame received from a network into a cell and reversely converting the cell into the original frame, request a setup of a virtual connection when the frame is generated, and output the cell by use of a virtual channel identifier value indicative of the set-up virtual connection, and connectionless data service units each adapted to set up the virtual connection at the request of the terminal, transfer the set-up virtual channel identifier value to the terminal which has requested the virtual connection setup, and perform a function of switching the cell transferred from the terminal.

11 Claims, 11 Drawing Sheets

| DESTINATION ADDRESS | OUTPUT PORT NO. | VIRTUAL PATH NO. |
|---|---|---|
| ADD1 | 3 | 2 |
| ADD2 | 6 | 1 |
| ADD3 | 6 | 2 |
| ADD4 | 6 | 3 |

| DESTINATION ADDRESS | VIRTUAL CHANNEL IDENTIFIER |
|---|---|
| ADD1 | VCI1 |
| ADD2 | VCI2 |
| ADD3 | VCI5 |
| ADD4 | VCI8 |

| OUTPUT PORT NO. | CELL KIND IDENTIFIER | RECEIVING-SIDE VIRTUAL PATH NO. |
|---|---|---|

| OUTPUT PORT NO. | CELL KIND IDENTIFIER | VIRTUAL CONNECTION NO. |
|---|---|---|

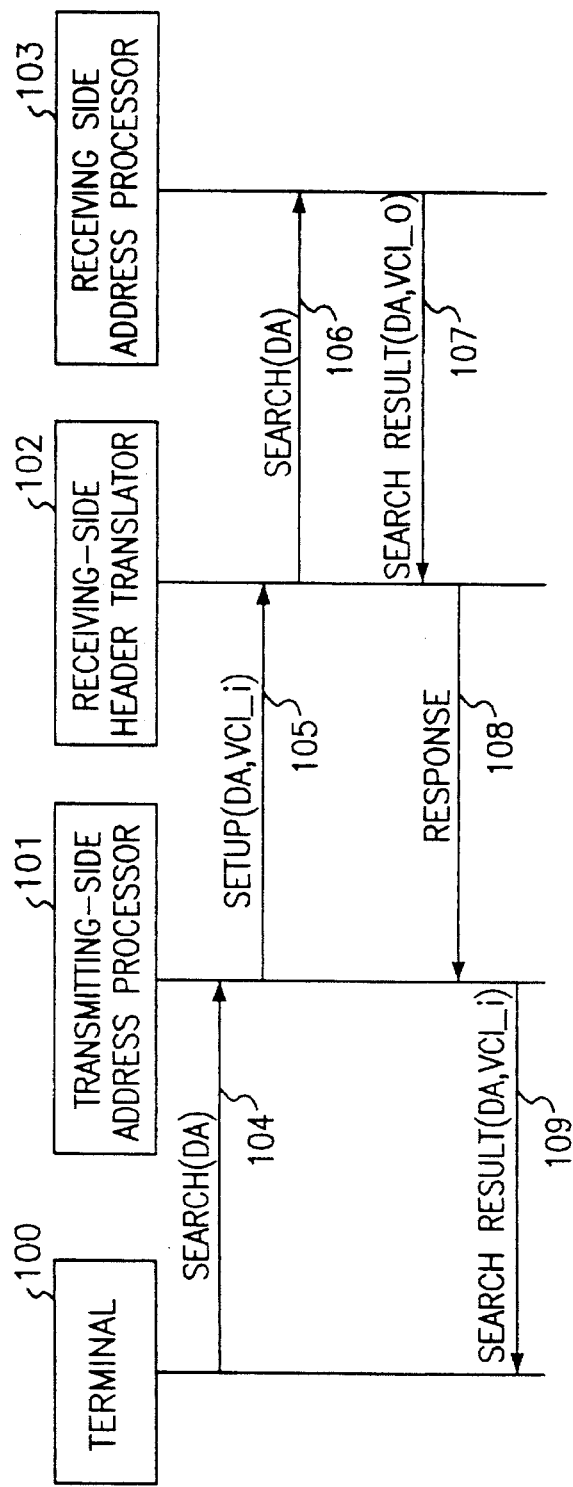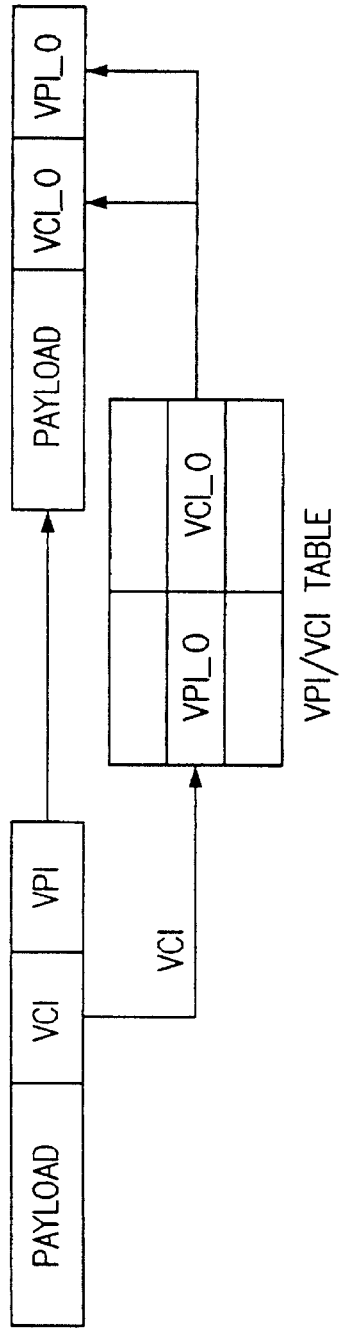

CONNECTIONLESS COMMUNICATION SYSTEM AND METHOD OF CONNECTIONLESS COMMUNICATION

BACKGROUND OF THE INVENTION

1. Field of the Invention

The present invention relates to a connectionless communication system and a method of connection communication, and more particularly to a large capacity connectionless communication system and a method of large capacity connectionless communication, capable of achieving an application to both a public network and a private network by centralizing all connectionless data and carrying out a routing of the centralized connectionless data by use of a separate connectionless cell switching unit having a rapid connection setup function and a function for maintaining the set-up connection.

2. Description of the Prior Art

Generally, traffics transferred via a network are classified into the connection type, wherein a frame transfer is achieved under a condition of setting up a communication path between a transmitter and a receiver by a connection setup procedure using, for example, telephones, and the connectionless type, wherein a frame transfer is achieved on the basis of a destination address included in a header of data frame without any connection setup procedure, as in a local area network (LAN).

An asynchronous transfer mode (ATM) network is of the connection type adapted to transfer frames to a destination necessarily using a connection setup procedure. In order to transfer connectionless data used in a LAN to a destination in such an ATM, a frame transfer method must be used, which method involves a connection setup achieved using a virtual channel previously set up or using an destination address value of every connectionless frame every time when the connectionless frame is generated.

In order to realize supply of connectionless data services in the ATM network, International Telecommunication Union (ITU) recommendation I.327 has proposed a method of directly connecting terminals to communicate with each other via a virtual channel and a method of using connectionless servers for achieving a routing function for connectionless data cells.

As the method of exchanging connectionless data through the virtual channel connected between terminals, there have been known a method of setting up a semi-permanent or permanent virtual channel between terminals and transferring data via the set-up virtual channel, and a method of transferring connectionless data under a condition that a connection has been set up using a destination address value of every connectionless frame every time when the connectionless frame is generated.

In the case of using the semi-permanent or permanent virtual channel, however, all of virtual channels associated with all terminals which are to communicate should be previously set up. As a result, the number of virtual channels to be set up is abruptly increased as the number of terminals to communicate is large. Such an increased number of virtual channels results in a complicated network management and an inefficient use of network resource. For this reason, this method can be applied only to the case where the number of terminals is small (Reference: N. Kavak, LAN interconnection over B-ISDN (ATM), Interworking'92, Swiss, 1992).

On the other hand, the latter method of setting up the virtual connection every time when the connectionless frame is generated involves a very large transfer delay caused by the connection setup. This is because the method involves not only setting up the virtual connection every time when the connectionless frame is generated, but also releasing the set-up connection after transfer of the frame. Furthermore, an overload is subjected to a switching system because of frequent connection setup and release procedures. As a result, this method can not be applied to a public network. The application of this method is limited to a small scale private network requiring simplified connection setup and release procedures.

In case of an ATM switching system, it requires a connection setup procedure for setting up a virtual connection. However, the connection setup procedure requires a very high time as compared to a transfer delay of cells. This results in a delay caused by connection setup and release of terminals generating connectionless traffic and an overload of the ATM switching system caused by frequent connection set up and release procedures. For this reason, such an ATM switching system uses typically a method of setting up a semi-permanent virtual connection and transferring connectionless cells via the set-up virtual connection.

In order to achieve a communication between LANs through an ATM network, it is necessary to set up a virtual channel on the basis of addresses of the LANs. To this end, the address of the ATM should be searched utilizing the addresses of LANs. An address resolution protocol (ARP) is also required (Reference: Akira Chugo, Kazuo Sakagawa, Broadband communication network architecture for distributed computing environments, IEICE Trans. Comm., Japan, March 1994).

In the case of the method of using connectionless servers, the network resource may be efficiently utilized by centralizing all connectionless data generated from terminals on corresponding connectionless servers via virtual channels each set-up between each of all terminals generating the connectionless data and each corresponding to one of the connectionless servers and routing the centralized data on the basis of destination address values of frames respectively in the servers (Reference: K. Kerkhof, A. Halderen, AAL type 5 to support the broadband connectionless data bearer service, Interworking'92, Swiss, 1992 and N. Kavak, LAN interconnection over B-ISDN (ATM), Interworking'92, Swiss, 1992).

In this method using connectionless servers, however, the connectionless data transferred in the form of cells is recovered in the form of original frames in each server so as to determine a destination on the basis of a destination address value of each frame. To this end, this method requires processing of a connectionless network access protocol (CLNAP) layer adapted to determine a destination on the basis of a destination address value of each recovered frame. As a result, the servers have a complex function. Consequently, it is difficult to realize connectionless servers of a large capacity. Therefore, this method has a problem that a bottle neck occurs at connectionless servers because all connectionless data are processed in a centralized manner.

A new method using a rapid connection setup has also been proposed in order to prevent an occurrence of the necking phenomenon and yet efficiently use the network resource. However, this method is inappropriate for connectionless services requiring setup of a new connection and release thereof for every frame. This is because the ATM switching unit construction requiring mapping of virtual path identifiers (VPIs)/virtual channel identifiers (VCIs), routing, update of a header translation table has a limitation on the rapid connection setup.

A scheme has also been made to take only the advantages of both the method using permanent virtual channels and the method using the rapid connection setup. This scheme is to setup a connection by using the rapid connection setup method and maintain the set-up connection by use of a cash. This method is effective for a private ATM-LAN requiring a small scale connection of terminals. However, this method has the disadvantages of a strict management of bandwidths of all terminal connections and a difficult application to a public network requiring a large scale connection of terminals.

Meanwhile, there has also been proposed a method of setting up a partial connection between a transmitting terminal and an ATM switch connected to a destination terminal and transferring connectionless cells via the set-up partial connection (Relating Patent "Support to connectionless services in ATM networking using partial connections" filed on Feb. 27, 1992 and bearing EPU Application No. 92810298.7, and Reference "J. Y. Boudec, H. L. Truong, Providing MAC services on an ATM network with point-to-point links", Interworking'92, Swiss, 1992). In accordance with this method, setup of a partial connection is achieved by a management function in response to a request of a terminal. Once the partial connection is set up, VPI/VCI values of the set-up connection is transferred to the terminal so as to generate a function for maintaining the set-up connection.

However, this method can not be applied to a typical ATM network complying with a standard recommended by the ITU. This is because the ATM switch, to which destination terminals are connected, uses VPI/VCI regions for cells divided into partial connection identifier (PCI), message multiplexing (MMX) identifier, connectionless (CL)/connection oriented (CO) identifier and end of message (EOM) identifier so that it may transmit cells received from a plurality of partial connections to receiving terminals by multiplexing them. Moreover, this method still has the problem of the delay caused by the connection setup.

A LAN traffic transfer method has also been proposed for an application to a case wherein a plurality of bridges respectively connected with LANs are connected to an ATM network. In accordance with this method, transfer of LAN traffics is accomplished through a virtual connection with a full-mesh structure set-up between associated bridges (Relating Patent "Network system with ATM network LAN bridge" filed on Aug. 27, 1990 and bearing Patent No. EP-473066). Used in this method is a local address filter table (L-AFT) in which each bridge stores addresses of terminals respectively connected with LANs associated therewith in a learned manner and a remote address filter table (R-AFT) in which each bridge stores addresses of terminals associated with other bridges and virtual connection numbers for the bridges in a learned manner. Accordingly, a virtual connection for transmitting cells is selected on the basis of contents of the tables.

For an application to a case wherein a plurality of LANs are connected to an ATM network constituted by a plurality of ATM switches, there has also been proposed a method of performing transfer of connectionless traffic from LANs in an ATM switching unit. In accordance with this method, once a frame from a LAN reaches one of the ATM switches, the ATM switch carries the destination address value of the frame to all LANs by use of a control cell to broadcast the destination address value of the frame. Of ATM switches receiving the control cell, the one associated with a terminal corresponding to the destination address transfers a response cell to the ATM switch which has transmitted the control cell. Upon receiving the response cell, the ATM switch which has transmitted the control cell transfers the frame to the received response cell.

However, both the methods mentioned just above propose only a method for selecting one direction to the destination from virtual connections. They have no disclosure relating to a solution to the problem involved in the large scale LAN connection or relating to an accomplishment of the large capacity.

On the other hand, there has been proposed a method wherein a connectionless data transmitting terminal requests a routing identifier (RI) value corresponding to a destination address in accordance with a routing identifier management function (RIMF) so that the RI value may be transmitted by a cell which carries the RI value on its VCI region. In accordance with this method, the RI value includes a switch node identifier (ID) and a port ID directing to a destination switching node. On the basis of this RI value, a routing is carried out. Each of the ATM switches has a VPI/VCI table for achieving a routing of connection cells and a header translation and an RI allocation table for achieving a routing of connectionless cells and a conversion of the RI value. This means that connection and connectionless cells should be processed differently depending on the kind or type thereof. For this reason, the kind or type of each cell should be indicated on the VPI region of the cell or other cell region.

As a result, an ATM switching unit operating in accordance with this method should have a function for processing connection and connectionless cells differently depending on the kind of cell. In accordance with this method, the setup of virtual connections for transfer of connectionless cells is carried out in a manner approximately similar to the setup of virtual connections for transfer of connection cells. Consequently, this method still has the problem of the delay caused by the connection setup.

SUMMARY OF THE INVENTION

Therefore, an object of the invention is to solve the above-mentioned problems encountered in the prior art and, thus, to provide a large capacity connectionless communication system and a method of large capacity connectionless communication, capable of achieving an application to both a public network and a private network by centralizing all connectionless data and carrying out a routing of the centralized connectionless data by use of a separate connectionless cell switching unit having a rapid connection setup function and a function for maintaining the set-up connection.

In accordance with one aspect, the present invention provides a connectionless communication system comprising: a plurality of terminal means each adapted to perform a function of converting a connectionless frame received from a network into a cell and reversely converting the cell into the original frame, request a setup of a virtual connection when the frame is generated, and output the cell by use of a virtual channel identifier value indicative of the set-up virtual connection; and a plurality of connectionless data service means each adapted to set up the virtual connection at the request of the terminal means, transfer the set-up virtual channel identifier value to the terminal means which has requested the virtual connection setup, and perform a function of switching the cell transferred from the terminal means.

In accordance with another aspect, the present invention provides a connectionless communication method employed in a connectionless communication system including a plurality of terminal means each adapted to perform a function of converting a connectionless frame received from a network into a cell and reversely converting the cell into the original frame, request a setup of a virtual connection when the frame is generated, and output the cell by use of a virtual channel identifier value indicative of the set-up virtual connection, and a plurality of connectionless data service means each adapted to set up the virtual connection at the request of the terminal means, transfer the set-up virtual channel identifier value to the terminal means which has requested the virtual connection setup, and perform a function of switching the cell transferred from the terminal means, each of the connectionless data service means including connectionless cell switching means adapted to perform a cell switching function on the basis of a virtual channel identifier value of a connectionless cell upon receiving the cell from one of the terminal means, address processing means connected to one of ports of the connectionless cell switching means and adapted to provide a destination address and a mapping information about virtual path identifier/virtual channel identifier values to the cell-transferring terminal means, and header translating means adapted to connect another one of the ports of the connectionless cell switching means to another connectionless data service means and translate virtual path identifier/virtual channel identifier values, comprising the steps of: (A) when a frame to be transferred is generated at one of the terminal means, transferring a search signal bearing a destination address value (DA) as a variable thereof to the address processing means of the connectionless data service means to which the terminal means generating the frame, namely, the transmitting-side terminal means is connected; (B) when the destination address value (DA) sent to the address processing means at the step (A) corresponds to terminal means connected to the connectionless data service means associated with the transmitting-side terminal means, searching an address table by the transmitting-side address processing means to generate a virtual channel identifier value (VCI_i), and a search result signal (DA, VCI_i) resulting from the search to the transmitting-side terminal means; (C) when the destination address value (DA) sent to the address processing means at the step (A) corresponds to a terminal connected to connectionless data service means other than that associated with the transmitting-side terminal means, searching a connection setup table allocated to a port of the connectionless cell switching means connected to the destination connectionless data service means via a virtual path, for an unused virtual channel (VCI_i) by the transmitting-side address processing means, and transferring a setup signal (DA, VCI_i) bearing the virtual channel (VCI_i) along with the destination address value (DA) received from the transmitting-side terminal as a variable thereof, to the header translating means of the destination connectionless data service means, namely, the receiving-side translating means; (D) when the setup signal (DA, VCI_i) is received in the receiving-side header translating means at the step (C), transferring a search signal bearing the destination address value, namely, the variable of the setup signal (DA, VCI_i) to the address processing means of the destination connectionless data service means, namely, the receiving-side address processing means by the receiving-side header translating means; (E) when the search signal is received in the receiving-side address processing means at the step (D), searching an address table on the basis of the destination address value of the search signal by the receiving-side address processing means to generate a virtual channel identifier value (VCI_o) indicative of a path connected to the terminal means corresponding to the destination address value, and transferring a search result signal (DA, VCI_o) bearing the virtual channel identifier value (VCI_o) to the receiving-side header translating means; (F) when the search result signal (DA, VCI_o) is received in the receiving-side header translating means at the step (E), storing the virtual channel identifier value (VCI_i) received from the transmitting-side address processing means and the virtual channel identifier value (VCI_o) received from the receiving-side address processing means in a mapping table by the receiving-side header translating means, and transferring a response signal to the transmitting-side address processing means to inform of a completion of the virtual connection setup between the connectionless data service means associated with the transmitting-side terminal and the destination connectionless data service means; and (G) when the response signal is received in the transmitting-side address processing means at the step (F), transferring the virtual channel identifier value (VCI_i) from the transmitting-side address processing means to the transmitting-side address processing means by use of the search result signal (DA, VCI_i) so that the virtual channel identifier value (VCI_I) is used for a cell transfer.

BRIEF DESCRIPTION OF THE DRAWINGS

Other objects and aspects of the invention will become apparent from the following description of embodiments with reference to the accompanying drawings in which:

FIGS. 6A and 6B are schematic views respectively illustrating different formats of VCI values each corresponding to a destination address value requested by a terminal;

FIG. 10 is a signal flow chart illustrating a procedure of setting up a connection to a destination when a frame to be transferred is generated at a terminal in accordance with the present invention;

FIG. 11 is a view explaining an operation of a VPI/VCI translator of a receiving-side header translator at a step of transferring connectionless cells in accordance with the present invention;

DETAILED DESCRIPTION OF THE PREFERRED EMBODIMENTS

Figure 1:
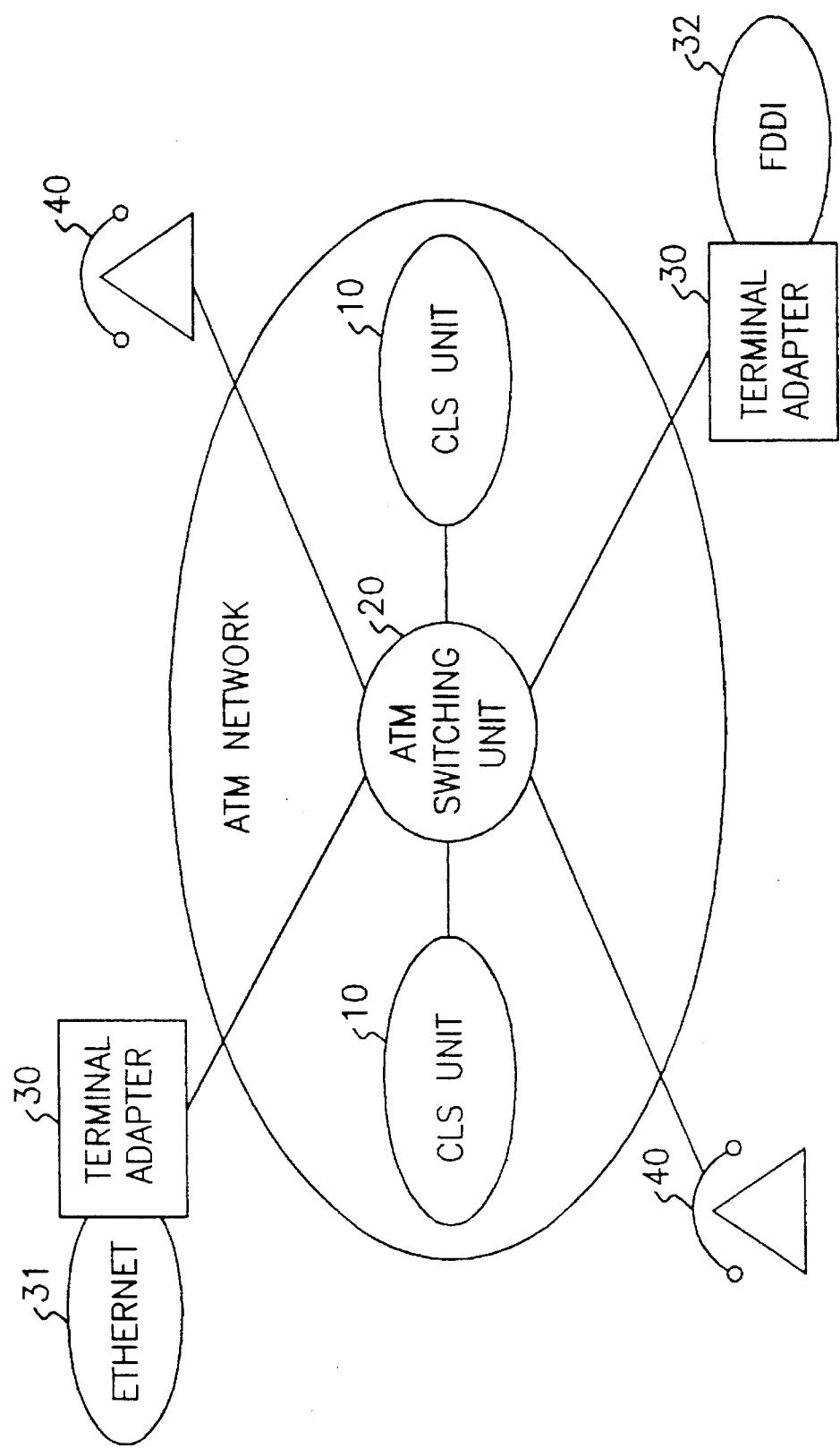
FIG. 1 is a schematic view illustrating an ATM network to which the present invention is applied.

FIG. 1 is a schematic view illustrating an ATM network to which the present invention is applied.

In the ATM network shown in FIG. 1, a connectionless traffic generating unit such as an ATM terminal 40 or a terminal adapter 30 is connected to connectionless data service (CLS) units 10 one to one via a virtual path of the ATM network.

The present invention is applied to the CLS unit 10 adapted to process connectionless cells in a centralized manner and the terminals 30 and 40 so as to achieve a connectionless cell switching function. In accordance with this connectionless cell switching function, connectionless cells are centralized and then processed in the CLS unit 10 in a manner similar to that in the method using connectionless servers. In other words, a connectionless traffic generated from each terminal is transferred to the CLS unit 10 via the ATM network, the ATM switching unit 20 and a virtual connection.

In accordance with the present invention, each of the terminals 30 and 40 allocates a value indicative of a destination of a cell to a VCI region of the cell and then transmits the cell. Accordingly, the CLS unit 10 carries out a header translating and cell switching function. Since the CLS unit 10 performs its function up to the ATM layer, the connectionless cell switching function is achieved using a switching unit having a similar arrangement to that of the typical ATM switching unit 20. This means that a large quantity of connectionless data can be processed in a simplified manner as compared to the method using connectionless servers.

Figure 2:
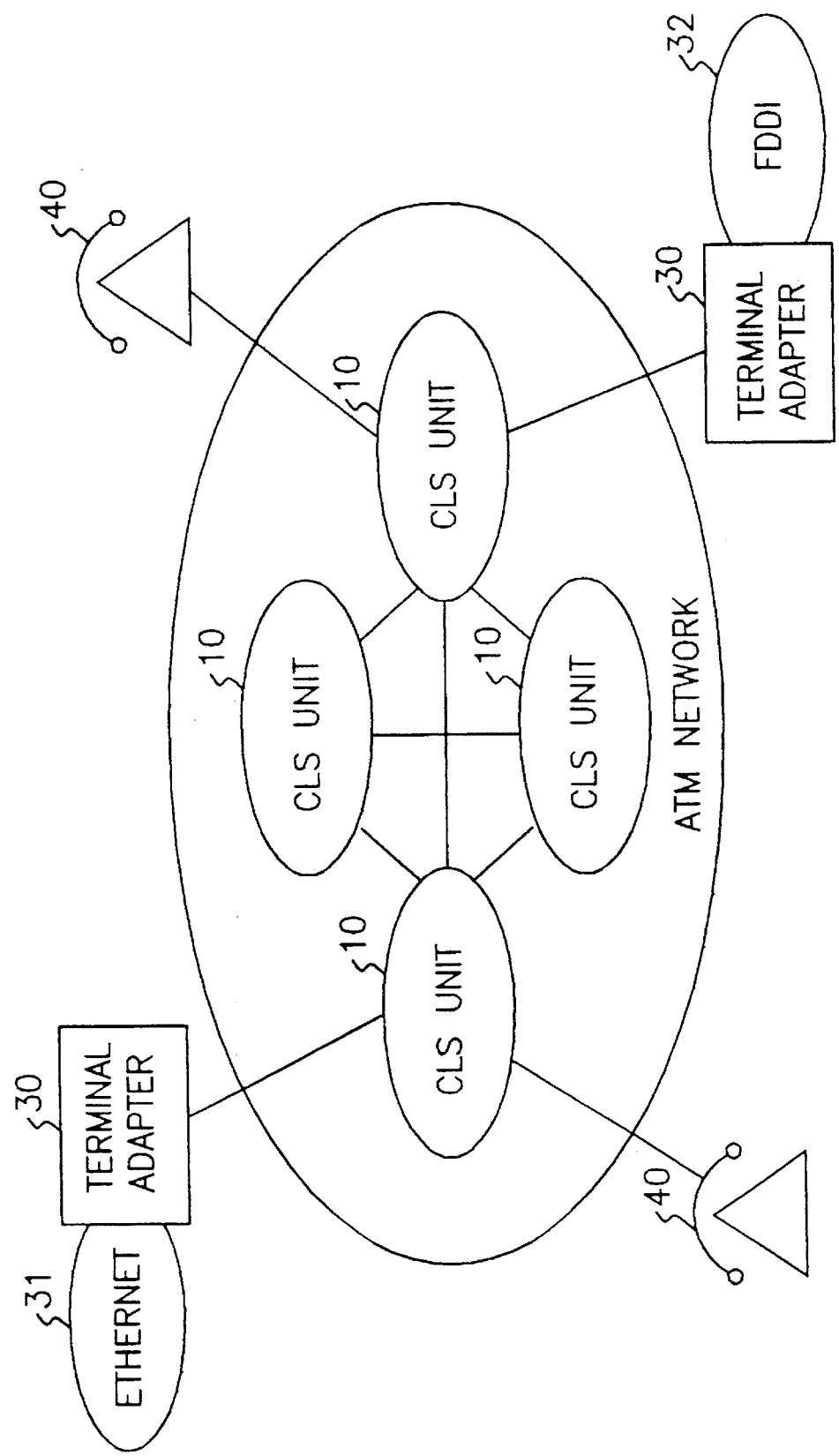
FIG. 2 is a schematic view illustrating a virtual network for the ATM network to which the present invention is applied.

FIG. 2 is a schematic view illustrating a virtual network for the ATM network to which the present invention is applied. In FIG. 2, elements respectively corresponding to those in FIG. 1 are denoted by the same reference numerals.

As shown in FIG. 2, the network includes a plurality of CLS units 10 each connected to a plurality of terminals 30 and 40 via virtual paths so as to transfer cells in both directions. The CLS units 20 are also connected to one another in the form of a full mesh.

When connectionless traffic is generated in the ATM terminal, a virtual connection to a destination of the connectionless traffic is set up in the virtual network established by the terminals 30 and 40 and the CLS units 10 so that the traffic is transferred through the set-up virtual connection, in accordance with the present invention. In order to minimize a transfer delay of connectionless traffic, accordingly, the time taken for the setup of the virtual connection should be minimized. To this end, the virtual network must have an arrangement simplified and yet enabling a rapid connection setup. As mentioned above, the CLS units 10 are connected to one another in the form of the full mesh so as to establish transfer paths each connected to two CLS units 10 at most, in accordance with the present invention. By virtue of such a full mesh connection of CLS units 10, the connection setup is also simplified.

Figure 3:
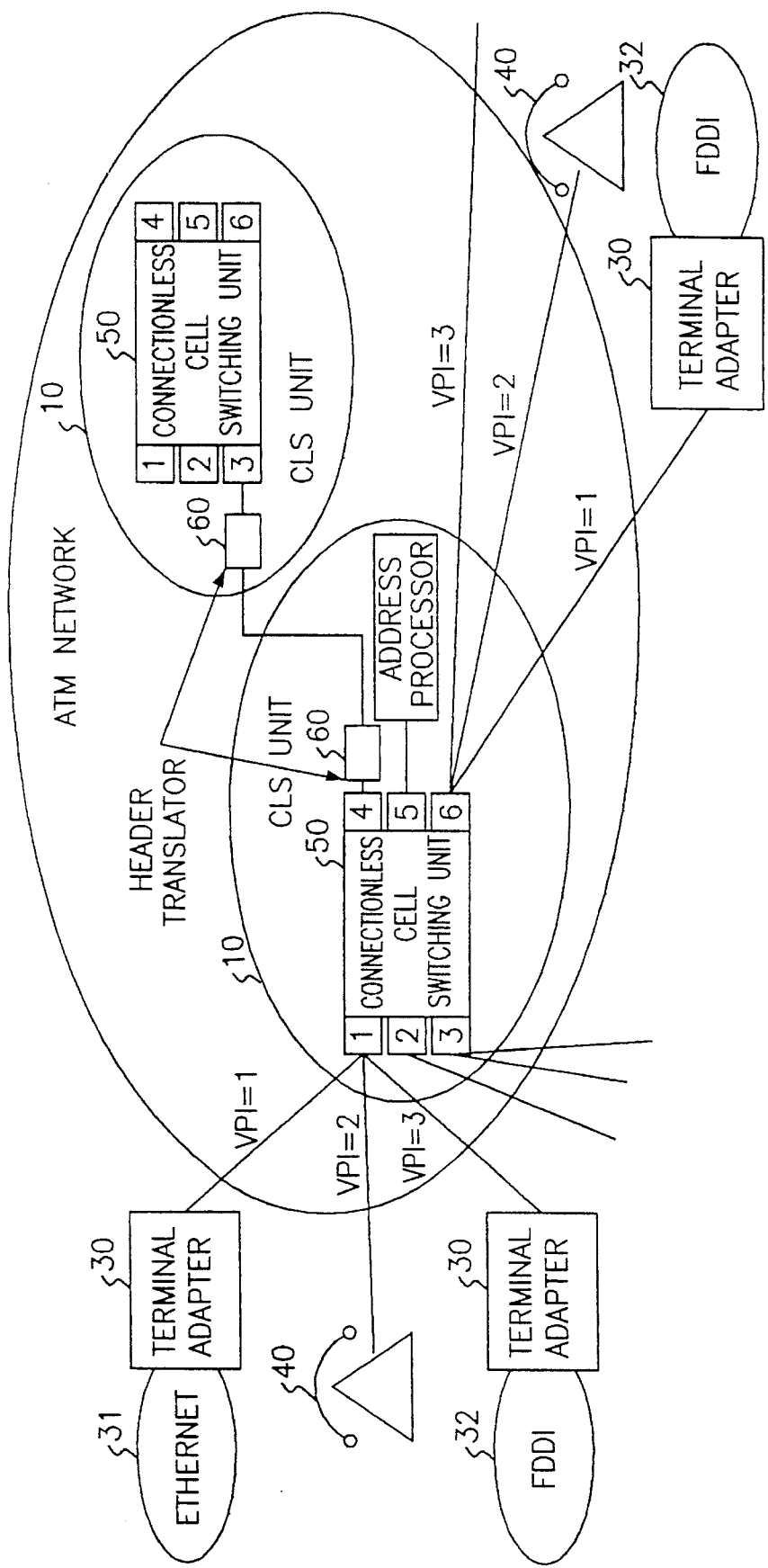
FIG. 3 is a connectionless communication system in accordance with an embodiment of the present invention.

FIG. 3 is a connectionless communication system in accordance with an embodiment of the present invention. In FIG. 3, elements respectively corresponding to those in FIGS. 1 and 2 are denoted by the same reference numerals.

As shown in FIG. 3, the connectionless communication system includes a plurality of CLS units 10. Each of the CLS units 10 includes a connectionless cell switching unit 50 adapted to perform a header translating and cell switching function depending on a VCI value of a connectionless cell upon receiving the cell, a header translator 60 connected to one of ports of the connectionless cell switching unit 50 and adapted to perform the header translation, and an address processor 70 connected to another one of the ports of the connectionless cell switching unit 50 and adapted to provide a destination address and a mapping information about VPI/VCI values to a corresponding one of terminals 30 and 40. Each of the terminals 30 and 40 serves to convert into a cell a connectionless frame generated from a computer 40 or a near communication network such as a fiber distributed data interface (FDDI) 32, an ethernet 31 or a token ring, to write on a cell header of the cell a mapped VCI value read out of a mapping table and indicative of a destination address value, and then transfer the cell carrying the mapped VCI value to one of the CLS units 10 connected thereto. The connectionless communication system further includes an ATM network for connecting each connectionless cell switching unit 50 to terminals 30 and 40 via virtual paths. With such an arrangement, the connectionless communication system performs the function for switching connectionless data generated from terminals. In this case, the header translation for each cell is carried out by each header translators 60 associated with the cell.

In accordance with the present invention, a semi-permanent virtual path is set up between each connectionless cell switching unit 50 and each of terminals 30 and 40 so that a cell may be transferred to the connectionless cell switching unit 50 without any connection setup delay. In virtual paths, transfer of cells is carried out without any modification of VCI values. Each of terminals 30 and 40 can transfer a cell carrying routing information on its VCI region to one of the connectionless cell switching units 50 connected to the terminal. The connectionless cell switching unit 50 receiving the cell selects one of its output ports on the basis of the VCI value of the received cell and transfers the cell at the selected output port.

Each of terminals 30 and 40 must recognize the VCI value corresponding to the destination address value of a connectionless frame generated. To this end, the connectionless cell switching unit 50 of each CLS unit 10 is connected at one of its input ports to each corresponding address processor 70 which has an address table bearing destination addresses of terminals 30 and 40 connected to the ATM network and position information respectively corresponding to the destination addresses, a connection setup table for setting up a virtual channel to other CLS unit 10 associated with a designated terminal bearing an address different from those in the address table, and a connection setup function utilizing the address table or the connection setup table. The connection setup function is carried out utilizing information obtained from the address table or the connection setup table when a connection setup is requested.

At the request of a terminal 30 or 40, each address processor 70 provides information obtained from its address table. Each of terminals 30 and 40 has a mapping table for storing a destination address received from an associated address processors 70 and a VCI value corresponding to the received destination address. When a terminal receives a frame to be transmitted, it searches its mapping table for the destination address of the received frame. Where the mapping table bears the destination address, the terminal carries a VCI value corresponding to the destination on a cell header. Where the mapping table bears no address corresponding to the destination address, the terminal requests the associated address processor 70 for the VCI value corresponding to the destination and then carries the VCI value received from the address processor 70 on the cell header.

In order to provide such a connectionless data service, a connectionless communication method of the present invention includes three steps, namely, a registration step of registering an address of each of terminals 30 and 40 connected to each connectionless cell switching unit 50 via virtual paths on the address processor 70 of the connectionless cell switching unit 50, a connection setup step of receiving a destination address from the address processor 70 and a VCI value corresponding to the destination address, and a connectionless cell transfer step of converting a connectionless traffic generated from each of the connected terminals 30 and 40 into a cell, carrying the VCI value corresponding to the destination address on a header of the cell and transferring the cell.

Every time when a new terminal 30 or 40 is connected to the connectionless cell switching unit 50 or when a terminal is disconnected from the connectionless cell switching unit 50, this information is transferred to the address processor 70 of the connectionless cell switching unit 50 at the registration step so as to always keep the address table correct. In other words, where a new terminal 30 or 40 is connected to the connectionless cell switching unit 50 via a virtual path, the virtual path number, the port number of the connectionless cell switching unit 50 and the address of the new terminal 30 or 40 are transferred to the address processor 70 which, in turn, registers the associated terminal.

This registration is carried out after completing the setup of the virtual path, directly by the associated terminal or by a network controller setting up the virtual path. Where the terminal 30 or 40 transfers directly a register cell bearing information about the address thereof, the connectionless cell switching unit 50 writes the number of its port connected to the terminal and the number of the virtual path connected to the terminal on the VCI region of the cell, and then transfers the cell to the address processor 70.

The connection setup step is carried out when a terminal 30 or 40 receives a new connectionless data frame bearing no VCI value corresponding to the destination address value of the frame. At the connection setup step, the destination address value of the frame is transferred to the address processor 70 associated with the terminal so as to obtain a VCI value corresponding thereto.

As mentioned above, each address processor 70 has the address table bearing addresses of all terminals 30 and 40 connected to the associated connectionless cell switching unit 50. The address processor 70 searches the address table for the destination address to obtain a VCI value corresponding to the destination address and then transfers the obtained VCI value to a terminal which has requested the VCI value.

Where the destination address value of the frame from the terminal 30 or 40 sent to the address processor 70 is indicative of a terminal associated with a CLS unit 10 other than that associated with the address processor 70, this address processor 70 sets up a virtual channel to an address processor 70 of the other CLS unit 10 so as to transfer a VCI value indicative of the set-up virtual channel to the terminal which has requested the VCI value.

After receiving the VCI value from the address processor 70, the terminal 30 or 40 stores the received VCI value in its mapping table. Such a signal information switching is carried out using a cell having the same size as that of a data transfer cell and bearing a signal information constituted by a specific bit of its VCI region for its distinction from the data transfer cell.

At the connectionless cell transfer step, the connectionless frame generated from the terminal 30 or 40 is converted into a cell or cells. At this step, the terminal 30 or 40 carries the virtual path number established between the terminal and the associated connectionless cell switching unit on the VPI region of the cell, and the VCI value corresponding to the destination address of the frame borne in the mapping table thereof on the VCI region of the cell. On the basis of the VCI value received, the connectionless cell switching unit 50 transfers the cell to its output port to which a destination terminal is connected. Simultaneously, the connectionless cell switching unit 50 also converts VPI/VCI values. Thereafter, the ATM network transfers the cell via the virtual path connected to a destination terminal on the basis of the VPI value of the cell.

As mentioned above, the transfer of connectionless traffic in the ATM layer can be achieved in accordance with the present invention by establishing a bidirectional virtual path between a terminal 30 or 40 and a CLS unit 10 associated with the terminal and between CLS units associated with each other, and setting up a virtual connection directing to a destination on the basis of a virtual channel of the virtual path. Since the virtual network for transfer of traffic is constituted by virtual paths and connectionless cell switching units 50 in accordance with the present invention, its arrangement can be simplified. Accordingly, it is possible to reduce the virtual connection setup delay generated in the virtual network and thereby minimize the transfer delay of connectionless cells. In addition, the set-up virtual connection is maintained for a predetermined time in accordance with the present invention. Accordingly, successive traffic directed to the same destination can be transferred without requiring any additional connection setup. As a result, a reduced transfer delay is achieved.

Since a new virtual connection is set up every time a frame directing to a new destination is generated, the number of set-up connections may exceed the number of allowable connections. In this case, a further virtual connection setup is possible no longer. In order to avoid such a situation, a part of the virtual connections previously setup is released in the following two cases:

First, where upon setting up a virtual connection, the mapping table of the terminal 30 or 40 associated with the virtual connection to be set up no longer has any region to store a new connection information, or where all virtual connection numbers usable for the connection setup table of the associated address processor 70 have been allocated, a part of the virtual connections previously setup is released to enable a new virtual connection to be set up;

Second, when a set-up virtual connection is maintained for a predetermined time at a state that it is unused for data cell transfer, this virtual connection is released to enable a new virtual connection to be set up.

Figures 4, 5, 6:
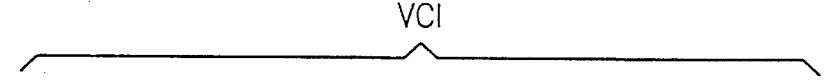
FIG. 4 is a schematic view illustrating an example of an address table provided at each of the address processors in accordance with the present invention.
FIG. 5 is a schematic view illustrating an example of a mapping table provided at each of terminals in accordance with the present invention.

FIG. 4 is a schematic view illustrating an example of the address table provided at each address processor 70. The address processor 70 manages numbers of ports of the associated connectionless cell switching unit 50 to which terminals having registered addresses are connected, respectively, and numbers of virtual paths each set-up between each port and each associated terminal 30 or 40.

Where the terminal 30 or 40 which has generated a frame requests the associated address processor 70 for information about the destination address of the frame, the address processor 70 searches its address table for an address value corresponding to the destination address and then generates a VCI value on the basis of the port number and the virtual path number both corresponding to the destination address, and then transfers the VCI value together with the requested destination address value to the terminal.

Where the destination address value transferred from the terminal 30 or 40 to the address processor 70 indicates a destination terminal connected to a CLS unit 10 other than that associated with the address processor 70, this address processor 70 searches for the virtual connection number of an unused virtual path connected to the other CLS unit 10 and then transfers the virtual connection number together with the destination address value to an address processor 70 of the other CLS unit 10 to which the destination terminal is connected, so as to set up a virtual connection.

FIG. 5 is a schematic view illustrating an example of the mapping table provided at each terminal 30 or 40. The terminal 30 or 40 stores in its mapping table a destination terminal address received from an address processor 70 associated therewith and a VCI value corresponding to the destination terminal address, Once the VCI value is stored in the mapping table, it is kept for a predetermined time even after completion of transfer of a corresponding frame. Accordingly, when the terminal 30 or 40 receives subsequently a frame bearing the same address as the previously transferred frame, it transfers the subsequent frame directly without any connection setup.

Where the mapping table no longer has any space to store a destination address newly set and a corresponding VCI value due to its limited size, a part of the items already stored in the mapping table is erased, thereby enabling the new values to be stored. Selection of items to be erased may be achieved using a method for randomly selecting items, a method for selecting items of lower use frequency or a method for selecting items left longer on the table. Upon erasing a part of items, each of VCI values erased is transferred to the address processor 70 so that the virtual connection corresponding to the erased VCI value is eliminated.

FIGS. 6A and 6B are schematic views respectively illustrating different formats of VCI values each corresponding to a destination address value requested by a terminal 30 or 40.

Where a destination terminal is connected to a connectionless cell switching unit 50 associated with the terminal 30 or 40 requesting the destination address value, the VCI value is determined by the number of a port of the connectionless cell switching unit 50 to which the destination terminal is connected and the number of a virtual path set-up between the connectionless cell switching unit 50 and the destination terminal, as shown in FIG. 6A.

On the other hand, where the destination is a CLS unit other than that associated with the terminal 30 or 40 requesting the destination address value, the VCI value is determined by the number of a port of the associated connectionless cell switching unit 50 connected with the other CLS unit 10 and the number of a virtual connection set-up through the port, as shown in FIG. 6B.

Since the meaning of regions of the VCI value used by the connectionless cell switching unit 50 in the case where the destination is the CLS unit 10 associated with the terminal requesting the destination address value is different from that in the case where the destination is the CLS unit 10 not associated with the terminal requesting the destination address value, the VCI value includes a cell kind identifier for identifying the kind of cell.

Figure 7:
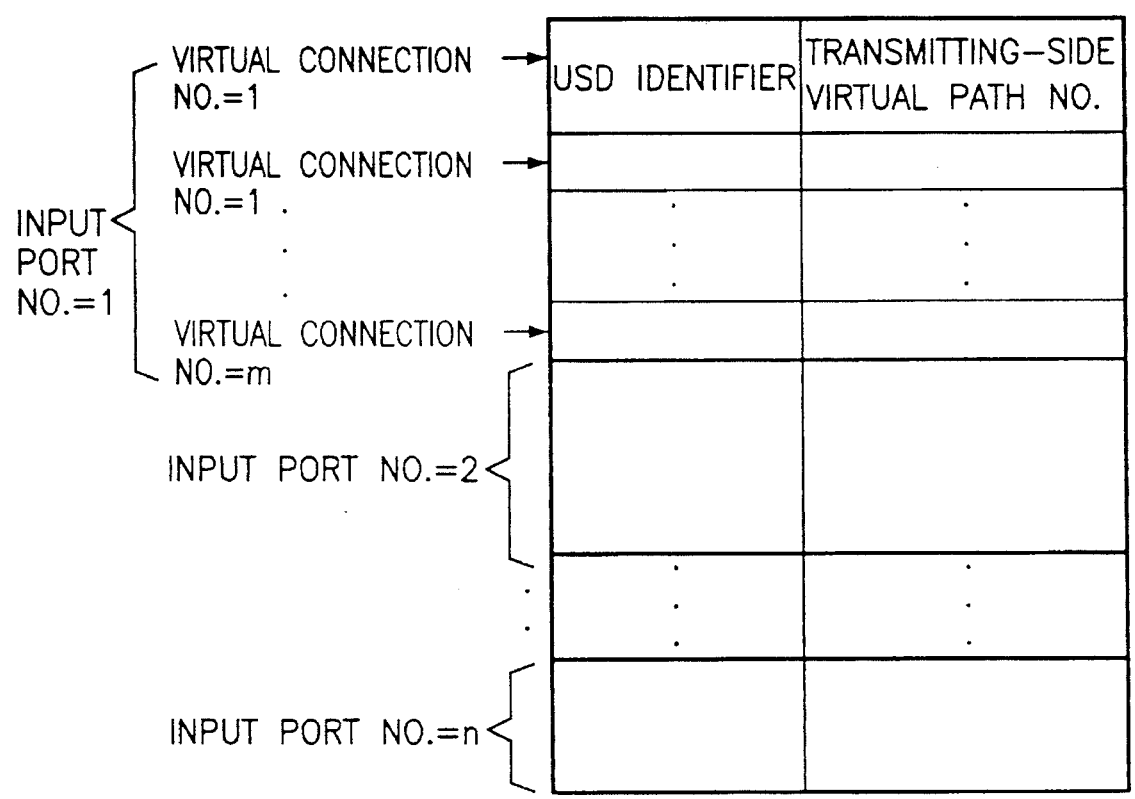
FIG. 7 is a schematic view illustrating an example of a connection setup table provided at each of address processors in accordance with the present invention.

FIG. 7 is a schematic view illustrating an example of the connection setup table provided at each address processor 70. Where the destination address value indicates the CLS unit 10 not associated with the terminal requesting the destination address value, the connection setup table is used to set up a virtual connection to the CLS unit 10.

Since each CLS unit 10 is connected with other CLS units 10 in the form of the full mesh, it has a plurality of virtual paths respectively connected to the other CLS units 10. For each virtual path, one connection setup table is allocated. The connection setup table includes a use identifier region including use identifiers each indicative of whether a corresponding virtual connection number has been used or not, and a virtual path number region including numbers of virtual paths each set-up between the connectionless cell switching unit 50 and a transmitting terminal using a corresponding one of the virtual connection numbers.

The connection setup table allocates one block for each input port of the connectionless cell switching unit 50 associated therewith. Rows in each block of the connection setup table are mapped one to one with virtual connection numbers.

Where the destination address corresponds to a terminal connected to a CLS unit not associated with a terminal requesting a connection setup, the address processor 70 associated with the terminal requesting the connection setup searches a block of the connection setup table associated with a port directing to the destination CLS unit 10. That is, the address processor 70 searches the block corresponding to the port connected to the terminal 30 or 40 requesting the connection setup for a row bearing a use identifier of "0" indicative of an unused condition. Where such a row is found, its row number is used as a virtual connection number.

Figure 8:
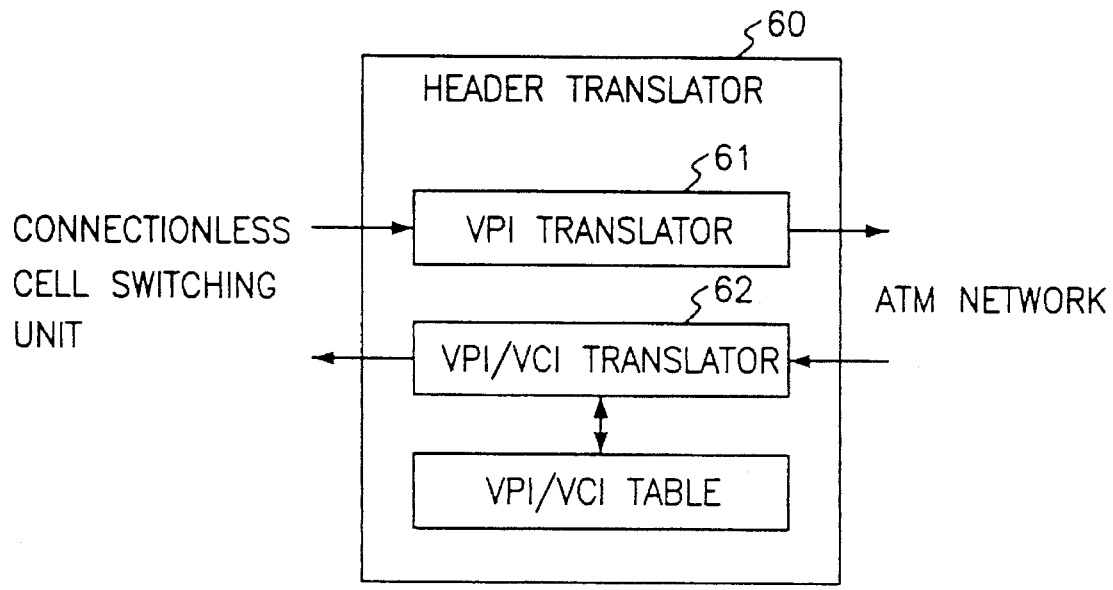
FIG. 8 is a block diagram illustrating a header translator in accordance with the present invention.

FIG. 8 is a block diagram illustrating the header translator 60 provided at each CLS 10 and adapted to perform a header translation when a connectionless cell switching unit 50 connected to the header translator 60 is connected to another connectionless cell switching unit 50.

Where two CLS unit 10 are connected to each other via a virtual path, header translators 60 thereof are connected between corresponding connectionless cell switching units 50 via the ATM network, as shown in FIG. 3. Each header translator 60 includes a VPI translator 61 adapted to assign the number of a virtual path previously set-up to the VPI region of the cell directing from a connectionless cell switching unit 50 of the CLS unit 10 associated with the header translator 60 to another CLS unit 10 via the ATM network, and a VPI/VCI translator 62 adapted to search a VPI/VCI table on the basis of the VCI value of a cell received from the another CLS unit 10 via the ATM network and translate values written on VPI/VCI regions of the cell into values searched, respectively.

The VPI translator 61 writes the assigned number of the virtual path set-up between CLS units 10 on the VPI region of the cell so as to achieve a routing to the destination CLS unit 10 in the ATM network. On the other hand, the VPI/VCI translator 62 maps a cell transferred from a CLS unit 10 other than that associated therewith on the basis of the number of a virtual connection set-up in the associated CLS unit 10 so that the cell can be transferred to a destination.

Figure 9:
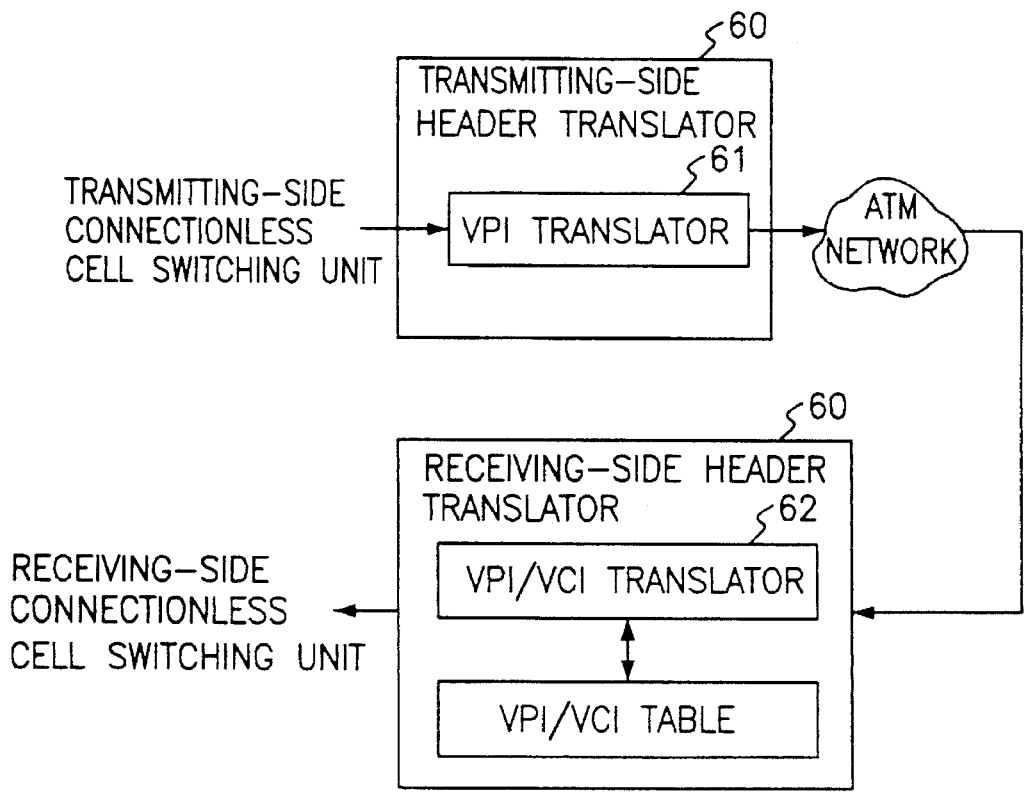
FIG. 9 is a view explaining a cell transfer carried out during a connectionless cell switching procedure in accordance with the present invention.

FIG. 9 is a view explaining a cell transfer carried out between CLS units 10 connected to each other. As shown in FIG. 9, when a cell from a transmitting-side connectionless cell switching unit 50 is transferred to a receiving-side connectionless cell switching unit 50, a transmitting-side header translator 60 connected to the transmitting-side connectionless cell switching unit 50 translates only the VPI value of the cell and then transfers the cell with the translated VPI value to the ATM network. On the basis of the VPI value, the ATM network transfers the cell to a receiving-side header translator 60. On the basis of the VCI value of the cell received from the ATM network, the receiving-side header translator 60 searches the VPI/VCI table to translated VPI/VCI values respectively into values allocated upon a connection setup and then transfers them to the receiving-side connectionless cell switching unit 50.

FIG. 10 is a signal flow chart illustrating a procedure of setting up a connection to a destination when a frame to be transmitted is generated at a terminal 100. Once the frame to be transmitted is generated, the terminal 100 transfers a search signal (DA) 104 bearing a destination address value DA as its variable to a transmitting-side address processor 101 of a connectionless cell switching unit to which the terminal 100 is connected, as shown in FIG. 10. When the destination address value DA sent to the transmitting-side address processor 101 corresponds to a terminal connected to the connectionless cell switching unit associated with the terminal 100, the address processor 101 searches its address table as shown in FIG. 4 to generate a VCI value VCI_i. As a result of the search, the address processor 101 sends a search result signal (DA, VCI_i) 109 to the terminal 100.

On the other hand, when the destination address value DA corresponds to a terminal connected to a CLS unit other than that associated with the terminal 100, the address processor 101 sets up a connection to the other CLS unit.

In the latter case, the connection between CLS units is set up in the following manner. When the search signal (DA) 104 from the terminal 100 received in the transmitting-side address processor 101 bears as its variable the destination address value indicative of a terminal connected to a CLS unit other than that associated with the terminal 100, the transmitting-side address processor 101 searches, for a virtual channel VCI_i unused, its connection setup table allocated to an input/output port of an associated connectionless cell switching unit connected to a destination connectionless cell switching unit via a virtual path. As a result of the search, the transmitting-side address processor 101 sends a setup signal (DA, VCI_i) 105 bearing the found virtual channel VCI_i along with its variable, namely, the destination address value DA received from the terminal 100, to a receiving-side header translator 102 of the other CLS unit connected to a destination terminal.

Upon receiving the setup signal (DA, VCI_i) 105, the receiving-side header translator 102 generates a search signal (DA) 106 using the value DA which is the variable of the setup signal (DA, VCI_i) 105. This search signal (DA) 106 is then transferred to a receiving-side address processor 103 which, in turn, searches its address table on the basis of destination address value of the search signal (DA) 106, thereby generating a VCI value VCI_o indicative of a path connected to the destination terminal. As a result of the search, the receiving-side address processor 103 sends a search result signal (DA, VCI_o) 107 to the receiving-side header translator 102.

The receiving-side header translator 102 stores the VCI value VCI_i received from the transmitting-side address processor 101 and the VCI value VCI_o received from the receiving-side address processor 103 in its VPI/VCI table. Where the receiving-side header translator 102 receives cells respectively generated from terminals all associated with the same CLS unit and to be transferred to the same destination, it allocates different VPI values VPI_o respectively to virtual connections having the same VCI value VCI_o in order to identify the cells at the destination. In this case, accordingly, each of the allocated VPI values VPI_o is also stored in the VPI/VCI table upon storing the VCI value VCI_o. Since the VPI values VPI_o are used as identifiers for identifying multiplexed cells, they perform a similar function to the multiplexing identification function of cells.

The receiving-side header translator 102 also transfers a response signal 108 to the transmitting-side address processor 101 so as to inform the transmitting-side address processor 101 of the completion of the virtual connection between the two CLS units. In response to the response signal 108, the transmitting-side address processor 101 sends the search result signal (DA, VCI_i) 109 to the terminal 100 so as to transfer the VCI value VCI_i to be used for the cell transfer to the terminal 100. Thereafter, the terminal 100 stores the VCI value VCI_i in its mapping table so as to subsequently use the stored VCI value VCI_i at the cell transfer step.

FIG. 11 is a view explaining an operation of the VPI/VCI translator of the receiving-side header translator at the step of transferring connectionless cells. At the cell transfer step, the receiving-side header translator translates VPI/VCI values of a cell fed from a connectionless cell switching unit other than that associated therewith respectively into those stored in its VPI/VCI table and then transfers them to a destination terminal via the associated connectionless cell switching unit. Here, the VPI value of the cell received in the receiving-side header translator is indicative of the path extending from the other connectionless cell switching unit to the receiving-side header translator via the ATM network whereas the VCI value of the cell is indicative of the identifier of the virtual connection set-up at the connection setup step. Accordingly, the VPI/VCI translator searches its VPI/VCI table using the VCI value received therein to read out values VPI_o and VCI_o and then translates the VPI/VCI values of the cell respectively into the read values VPI_o and VCI_o which are, in turn, transferred to the associated connectionless cell switching unit.

As a result, the cell is transferred to the destination via the associated connectionless cell switching unit because the values VPI_o and VCI_o are indicative of the path connected to the destination terminal and set-up at the connection setup step.

Figure 12:
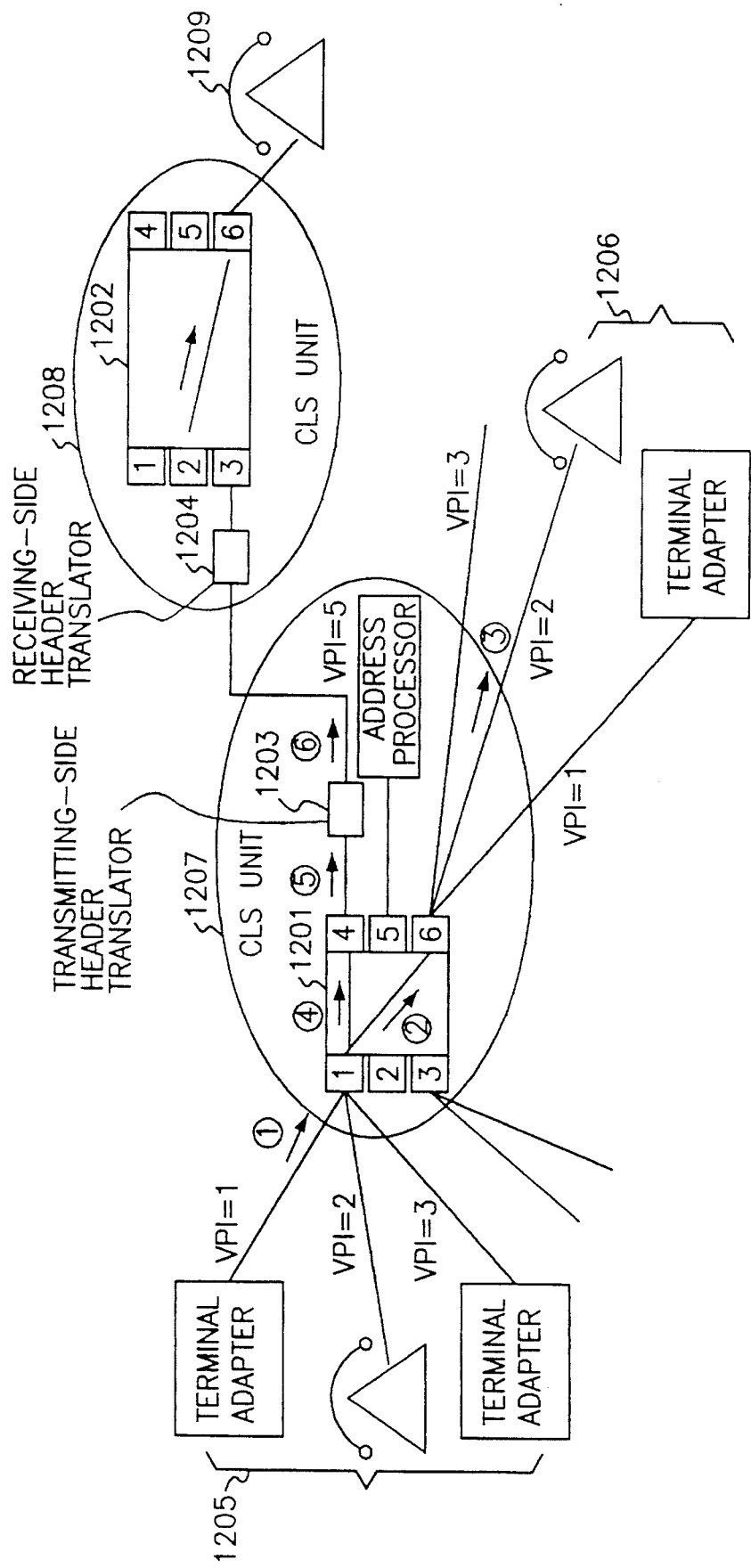
FIG. 12 is a schematic view explaining an operation of the connectionless communication system at the connectionless cell transfer step in accordance with the present invention.

FIG. 12 is a schematic view explaining operation of the connectionless communication system at the connectionless cell transfer step in accordance with the present invention. In FIG. 12, cell transfer procedures for two different cases are shown.

The first case is the case where a cell from a transmitting terminal 1205 is transferred to a terminal 1206 connected to the same connectionless cell switching unit as the terminal 1205. This connectionless cell switching unit is denoted by the reference numeral 1201 in FIG. 12. In this case, the cell is transferred via a path defined by three sequential steps (1), (2) and (3) in a CLS unit 1207, as shown in FIG. 12.

The second case is the case where the cell from the transmitting terminal 1205 is transferred to a terminal 1209 connected to a connectionless cell switching unit 1202 other than that associated with the transmitting terminal 1205. In this case, the cell is transferred to a receiving-side header translator 1204 of a CLS unit 1208 via a path defined by four sequential steps (1), (4), (5) and (6), as shown in FIG. 12. The receiving-side header translator 1204 carries out a header translation operation as described in conjunction with FIG. 11. In this case, the cell transfer from the receiving-side header translator 1204 to the receiving terminal 1209 in the CLS unit 1208 is achieved by the same steps as the steps (1), (2) and (3) achieved in the CLS unit 1207.

Figure 13:
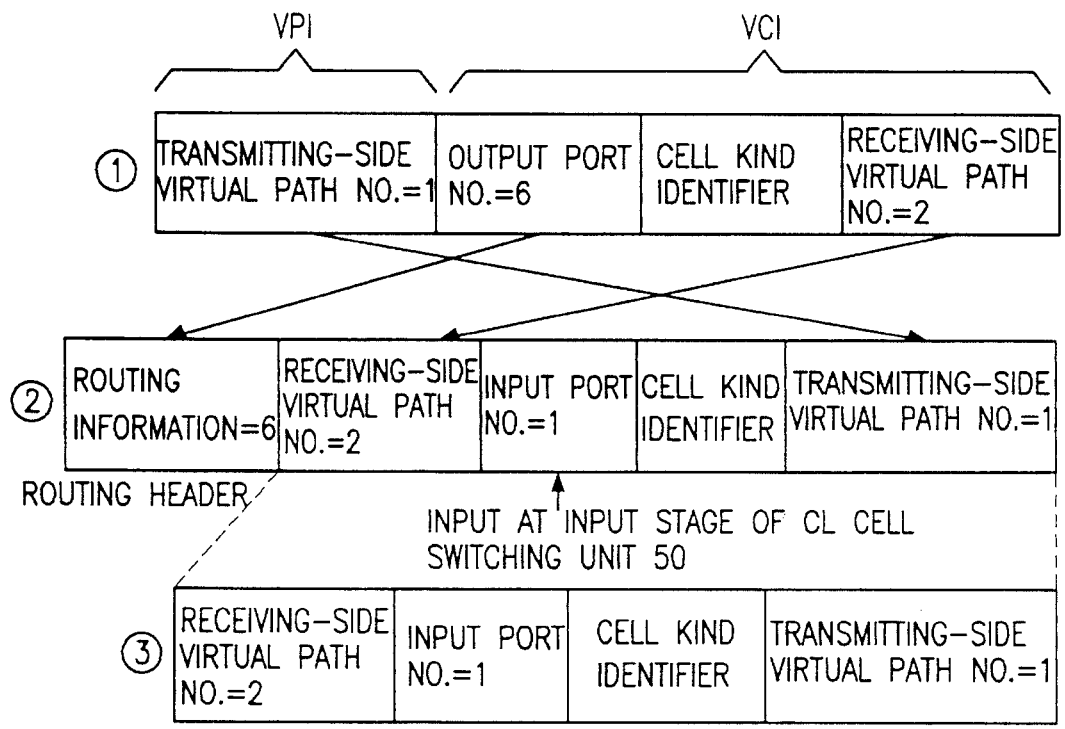
FIG. 13 is a view illustrating translation of values respectively stored on VPI/VCI regions of a cell in a cell transfer procedure where a destination terminal for the cell is associated with the same connectionless data service unit as a transmitting terminal for the cell.

FIG. 13 is a view illustrating translation of values respectively stored on VPI/VCI regions of the cell in the procedure involving the steps (1), (2) and (3) shown in FIG. 12. Where a destination terminal for the cell is associated with the same CLS unit as a transmitting terminal for the cell, that is, where the destination terminal is the terminal 1206 connected to the CLS unit 1207, VPI/VCI values, having the format (1) shown in FIG. 13, of the cell being transferred from the transmitting terminal to the connectionless cell switching unit 1201 of the CLS unit 1207 are translated into those having the format (2) shown in FIG. 13 at an input port of the connectionless cell switching unit 1201. The cell bearing the translated VPI/VCI values is then transferred to an output port of the connectionless cell switching unit 1201. At the output port, the cell carries VPI/VCI values having the format (3) shown in FIG. 13 respectively on its VPI/VCI regions. The resultant cell is then transferred to the destination terminal 1206.

In other words, the value indicative of the output port number stored in a portion of the VCI region of the cell received in the connectionless cell switching unit 1201 is used as a routing information for determining an output port of the connectionless cell switching unit 1201 for outputting the cell. The value indicative of the receiving-side path number stored in the VCI region of the cell is shifted to the VPI region of the cell so as to indicate the number of a path along which the cell emerging from the connectionless cell switching unit 1201 is transferred to the destination via the ATM network.

Since each terminal may receive cells respectively transmitted from a plurality of terminals in a multiplexed manner, it should have a function of identifying these cells individually so as to recover original frames. To this end, the connectionless cell switching unit 1201 writes the transmitting-side virtual path number, which has been stored in the VPI region of the cell, on the portion of VCI region in which the receiving-side virtual path number was stored. The connectionless cell switching unit 1201 also writes the input port number on the portion of VCI region in which the output port number was stored. Accordingly, cells from different transmitting terminals transferred to the same destination terminal bear different VCI values, respectively. By virtue of such different VCI values, original frames can be recovered at the destination terminal.

Figure 14:
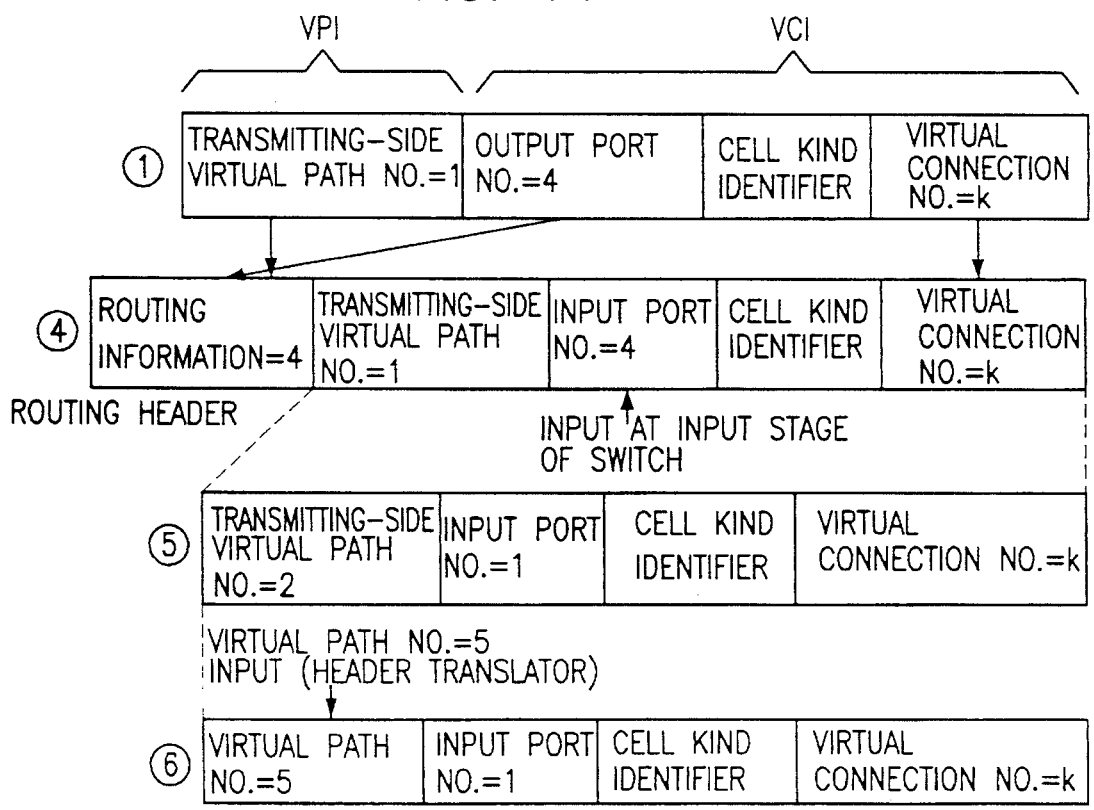
FIG. 14 is a view illustrating translation of values respectively stored on VPI/VCI regions of a cell in the cell transfer procedure where a destination terminal for the cell is associated with a connectionless data service unit other than that associated with a transmitting terminal for the cell.

FIG. 14 is a view illustrating translation of values respectively stored on VPI/VCI regions of the cell in the procedure involving the steps (1), (4), (5) and (6) shown in FIG. 12. Where a destination terminal for the cell is associated with a CLS unit other than that associated with a transmitting terminal for the cell, that is, where the to destination terminal is the terminal 1209 connected to the CLS unit 1202, VPI/VCI values, having the format (1) shown in FIG. 14, of the cell being transferred from the transmitting terminal 1205 to the connectionless cell switching unit 1201 associated with the transmitting terminal 1205 are translated into those having the format (4) shown in FIG. 14 at an input port of the connectionless cell switching unit 1201. The cell bearing the translated VPI/VCI values is then transferred to a selected output port of the connectionless cell switching unit 1201 on the basis of a routing information borne in the cell. At the output port, the routing information is erased so that the cell has the format (5) shown in FIG. 14. The resultant cell is then transferred to the transmitting-side header translator 1203 which, in turn, writes on the VPI region of the received cell the number of a virtual connection set-up between the receiving-side CLS unit 1208 and the transmitting-side header translator 1203. As a result, the cell has the format (6) shown in FIG. 14. The cell is then transferred to the receiving-side header translator 1204 of the receiving-side CLS unit 1208.

In other words, the value indicative of the output port number stored in a portion of the VCI region of the cell received in the connectionless cell switching unit is used as the routing information for determining the output port of the connectionless cell switching unit. On the output port number region, the number of the input port receiving the cell is written. The cell kind identifier and the virtual connection number respectively stored in VPI/VCI regions of the cell are transferred to the output port of the connectionless cell switching unit 1201 without any change. On the other hand, the transmitting-side header translator 1203 writes on the VPI region of the cell the number of the virtual path set-up between the transmitting-side header translator 1203 and the receiving-side CLS unit 1208 and then transfers the resultant cell to the receiving-side CLS unit 1208. The receiving-side header translator 1204 translates the VPI/VCI values of the cell into those indicative of the destination terminal on the basis of the VCI value of the cell. The cell is then transferred to the destination terminal 1209 in accordance with the same procedure as that of FIG. 13 involving the steps (1), (2) and (3).

The VPI/VCI translation carried out at each input port of the connectionless cell switching unit 1201 in the case where the destination is a terminal associated with the same CLS unit as the transmitting terminal is different from that in the case where the destination is a terminal associated with a CLS unit other than that associated with the transmitting terminal. In order to identify these two cases, the cell kind identifier portion of the VCI region of cell bears different values respectively for the two cases. These values are determined when a connection setup is carried out.

Each connectionless cell switching unit performs the routing function and the VPI/VCI value translation function using VPI/VCI values of a cell received therein. However, these functions of the connectionless cell switching unit are only to shift position of information stored in VPI/VCI regions or to add the input port number, as compared to functions of the conventional ATM switching unit. Accordingly, the connectionless cell switching unit does not require any additional control function for the routing and header translation. This means that the connectionless cell switching unit is simple in construction, as compared to the conventional ATM switching unit.

Figure 15:
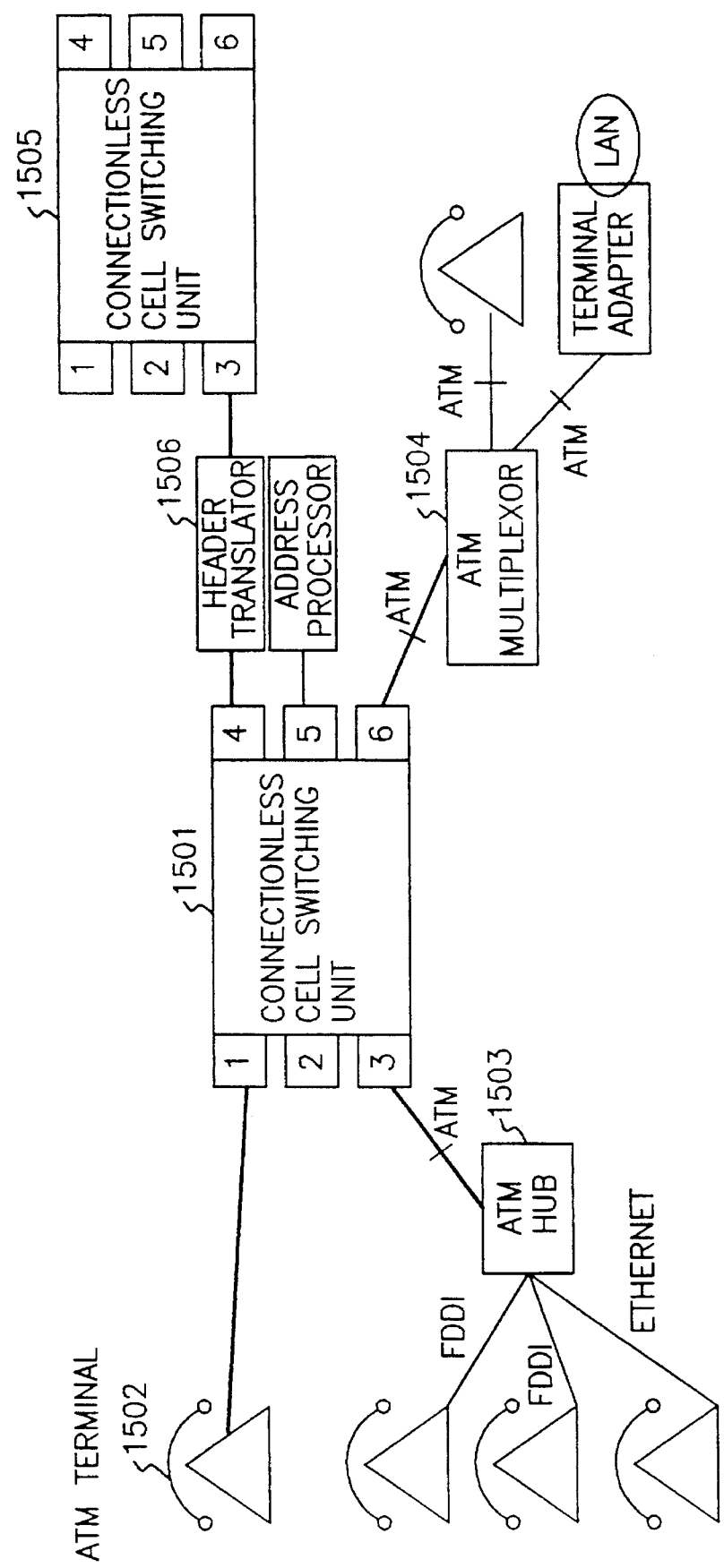
FIG. 15 is a connectionless communication system in accordance with another embodiment of the present invention.

FIG. 15 is a connectionless communication system in accordance with another embodiment of the present invention. This system is applied to a case wherein all terminals generate only connectionless traffics, as in a private ATM-LAN. In accordance with this embodiment, the system is constituted only by terminals and connectionless cell switching units without using any ATM network.

As shown in FIG. 15, the connectionless communication system includes connectionless cell switching units 1501 and 1505, ATM terminals 1502 each having a mapping table, an ATM hub 1503 having a plurality of conventional LAN interface terminals such as FDDIs and ethernets, and an ATM multiplexor 1504 having a plurality of ATM interfaces respectively connected to a plurality of terminals and one or more ATM interfaces respectively connected to corresponding ones of the connectionless cell switching units. The ATM hub serves to convert a frame received from a LAN into a cell, transmit the cell to a selected one of the transmitting-side connectionless cell switching units 1501, receive the cell from the selected transmitting-side connectionless cell switching unit 1501, and select a LAN interface to output the cell on the basis of the VPI value of the cell. On the other hand, the ATM multiplexor 1504 serves to multiplex cells received from a plurality of terminals, transfer the multiplexed cells respectively to corresponding ones of the connectionless cell switching units 1501, receive the cell from each of the connectionless cell switching units, and select an ATM interface to output the cell on the basis of the VPI value of the cell. A header translator 1506 is connected between each transmitting-side connectionless cell switching unit 1501 and each receiving-side connectionless cell switching unit 1505. The header translator 1506 serves to translate VPI/VCI values of a cell transferred between the units 1501 and 1505 respectively into those determined upon a connection setup. The connectionless communication system further includes an ATM-LAN for connecting the ATM terminals 1502, the ATM hubs 1503 and the ATM multiplexors 1504 directly to associated connectionless cell switching units 1501 and 1505 by means of optical cables or metal cables without using any virtual connection of the ATM network.

Although this system is illustrated as having only one ATM hub and only one ATM multiplexor, it may have a plurality of ATM hubs and a plurality of ATM multiplexors.

Between each connectionless cell switching unit and each terminal which may be each ATM terminal 1502 directly connected to the connectionless cell switching unit or each terminal connected to the connectionless cell switching unit via each ATM hub 1503 or each ATM multiplexor 1504, a connectionless data service is provided in the same manner as described above. In other words, a plurality of virtual paths are multiplexed in each cable connecting each connectionless cell switching unit with each ATM hub 1503 or each ATM multiplexor 1504. These multiplexed virtual paths branch in the ATM hub 1503 or the ATM multiplexor 1504 and terminate at corresponding LAN interfaces or corresponding terminals, respectively.

LAN and ATM interfaces branching from each ATM hub 1503 or each ATM multiplexor 1504 use different VPI values allocated thereto, respectively. Each of LAN and ATM interfaces may use one or more VPI values. In each ATM hub 1503, data transfer is carried out through each LAN interface by frames. To this end, each ATM hub 1503 includes a function of converting a frame into a cell and reversely converting the cell into the frame and a mapping table.

Since the cell transfer between connectionless cell switching units is carried out through optical cables or metal cables without using any ATM network, it is unnecessary to provide header translators at respective ports of the connected switching units, as in the case of FIG. 3. In the case of FIG. 15, only one common header translator 1506 having only a bidirectional VPI/VCI translation function is provided between the connected connectionless cell switching units. In the case of FIG. 9, accordingly, two header translators respectively performing the cell transmitting function and the cell receiving function may be replaced by the header translator 1506 having the bidirectional operation function.

Figure 16:
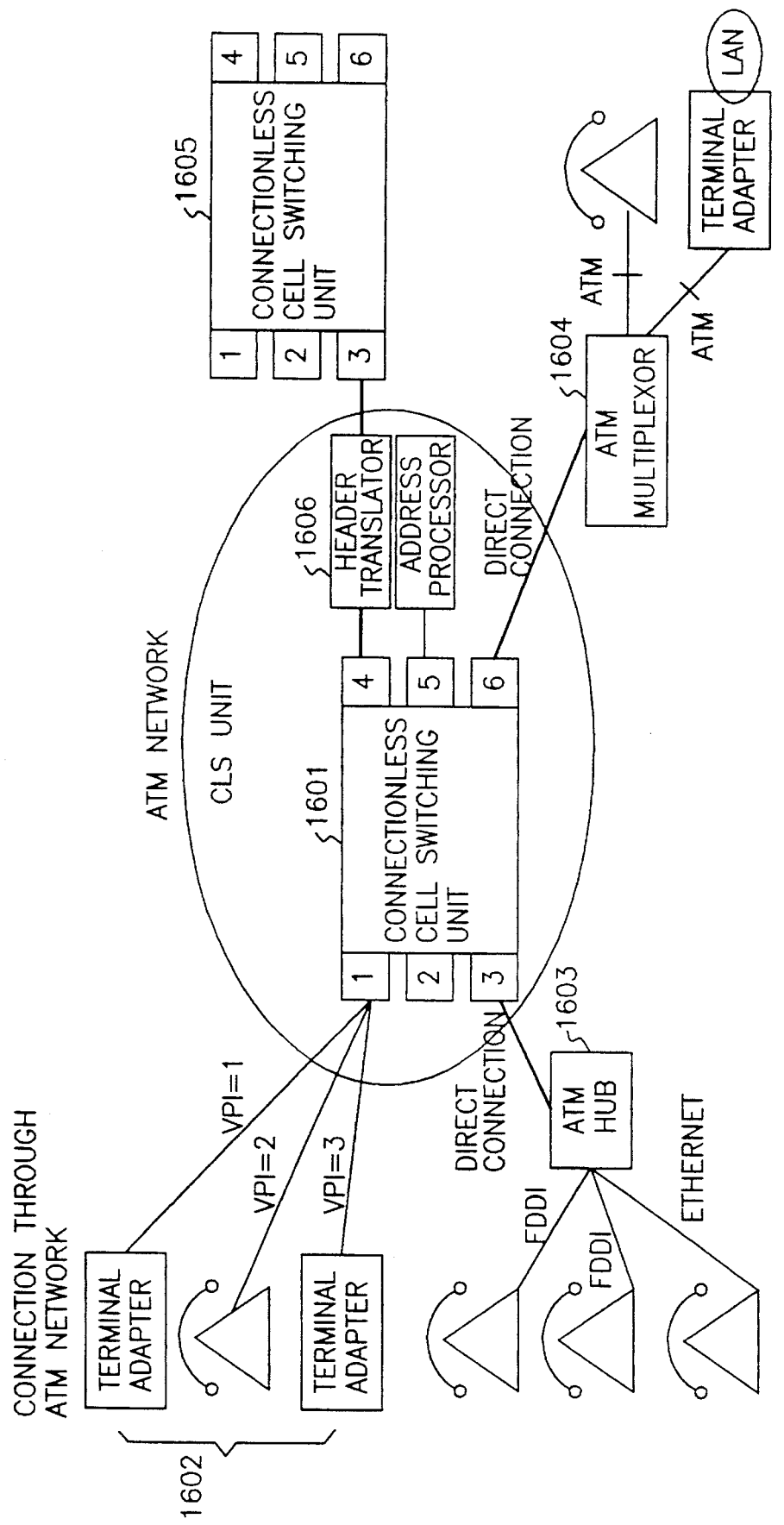
FIG. 16 is a connectionless communication system in accordance with another embodiment of the present invention.

FIG. 16 is a connectionless communication system in accordance with another embodiment of the present invention. In accordance with this embodiment, a connection achieved by virtual paths of an ATM network is used together with a direct connection achieved by optical cables or metal cables in order to achieve connections among a transmitting-side connectionless cell switching unit 1601, an ATM terminal 1602, an ATM hub 1603, an ATM multiplexor 1604 and a receiving-side connectionless cell switching unit 1605.

In this case, a cell transfer between a connectionless cell switching unit and each of terminals respectively positioned at physically different places is achieved through one or more virtual paths. Accordingly, where the terminals are those connected to the connectionless cell switching unit via an ATM network, the connection is obtained by a selected one of virtual paths of the ATM network. Where the terminals are those connected to an ATM hub or an ATM multiplexor directly connected to the connectionless cell switching unit by a cable, the connection is obtained by one or more of virtual paths provided at each of LANs and terminals branching from the ATM hub or the ATM multiplexor on the basis of VPI value. Accordingly, it is possible to provide connectionless cell data services through both the public network and the private ATM-LAN.

Where the connection between connectionless cell switching units is achieved using the ATM network, header translators should be provided at respective ports of the connected switching units, as shown in FIG. 3. However, a single header translator having a combined construction of the header translators of FIG. 3 may be used in the case wherein the connectionless cell switching units are connected by means of an optical cable or a metal cable, as shown in FIG. 15.

As apparent from the above description, the present invention provides a connectionless communication system including CLS units each having an address processor, a header translator and a connectionless cell switching unit, thereby establishing a virtual network connecting terminals and CLS units via virtual paths. In order to achieve a frame transfer in such a virtual network, the present invention also provides a connectionless communication method involving a connection setup for determining a VCI value of a cell directing to a destination and a connectionless cell transfer for transferring the cell to the destination on the basis of the determined VCI value.

In accordance with the present invention, the virtual network established in the ATM network has a simplified arrangement, thereby simplifying a connection setup procedure for requesting a VCI value corresponding to a destination address, as compared to the connection setup achieved in the ATM network. As a result, the connection setup delay is reduced. This results in a reduced transfer delay of connectionless cells.

Furthermore, once a connection is set up, it is maintained for a predetermined time even when it is unused. Accordingly, it is possible to reduce the number of connection setup times and thereby reduce the transfer delay of connectionless cells.

In accordance with the present invention, routing of connectionless cells for the transfer of the cells is determined at the ATM layer. Therefore, connectionless cell switching units similar to conventional ATM switching units can be used, thereby enabling a large capacity connectionless communication system to be easily realized.

In accordance with the present invention, it is possible to provide connectionless data services by establishing a virtual network in an ATM-based B-ISDN or a private ATM network. An independent connectionless network utilizing no ATM may also be realized by achieving connections between each connectionless cell switching unit and each terminal and between connectionless cell switching units directly by cables.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A connectionless communication system comprising:
   a plurality of terminal means each adapted to perform a function of converting a connectionless frame received from a network into a cell and reversely converting a cell into an original frame, request setup of a virtual connection when a frame is generated, and output the cell with a virtual channel identifier value indicative of the associated set-up virtual connection, and each including
   a mapping table in which the virtual channel identifier value indicative of the set-up virtual connection and a position information corresponding to the virtual channel identifier value are stored; and
   a plurality of connectionless data service means each adapted to set up the virtual connection at the request of the terminal means, transfer the set-up virtual channel identifier value to the terminal means which has requested the virtual connection setup, and perform a function of switching the cell transferred from the terminal means, and each including:
   a) a connectionless cell switching means adapted to perform a cell switching function on the basis of a virtual channel identifier value of a connectionless cell upon receiving the cell from one of the terminal means;
   b) an address processing means connected to one port of the connectionless cell switching means and adapted to provide destination address and mapping information about virtual path identifier values and virtual channel identifier values to the cell-transferring terminal means; and
   c) a header translating means adapted to connect another one of the ports of the connectionless cell switching means to another connectionless data service means and translate virtual path identifier values and virtual channel identifier values; and
   wherein each of said connectionless data service means is connected to corresponding ones of said terminal means respectively via virtual paths each having a bidirectional cell transfer function.

2. A connectionless communication system in accordance with claim 1, wherein all of the connectionless data service means are connected to one another in the form of a full mesh.

3. A connectionless communication system in accordance with claim 1, wherein the virtual channel identifier value includes a cell type identifier for identifying a type of case where a destination is associated with a connectionless data service means which is the same as the connectionless data service means associated with the cell transferring terminal means, and a type of case where the destination is associated with connectionless data service means other than that associated with the cell transferring terminal means.

4. A connectionless communication system comprising:
   a plurality of terminal means each adapted to perform a function of converting a connectionless frame received from a network into a cell and reversely converting a cell into an original frame, request setup of a virtual connection when a frame is generated, and output the cell with a virtual channel identifier value indicative of the set-up virtual connection;
   a plurality of connectionless data service means each adapted to set up the virtual connection at the request of the terminal means, transfer the set-up virtual channel identifier value to the terminal means which has requested the virtual connection setup, and perform a function of switching the cell transferred from the terminal means;
   at least one asynchronous transfer mode hub provided with a plurality of local area network interface functions, a function of converting a frame received from each of local area network interfaces into a cell to be transferred to one of the connectionless data service means, and a function of selecting one of the local area network interfaces on the basis of a virtual path identifier value of a cell upon receiving the cell from the connectionless data service means, recovering the original frame associated with the received cell after the selection, and outputting the recovered frame to the selected interface; and
   an asynchronous transfer mode multiplexor provided with a plurality of asynchronous transfer mode interfaces respectively connected with the terminal means and at least one asynchronous transfer mode interface connected with a corresponding one of the connectionless data service means and adapted to multiplex cells respectively received from the terminal means, transfer the multiplexed cells to the corresponding connectionless data service means, and select one of the asynchronous transfer mode interfaces on the basis of a virtual path identifier value of each cell on receiving the cell from the connectionless data service means.

5. A connectionless system in accordance with claim 4, wherein the asynchronous transfer mode terminals, the asynchronous transfer mode hub, the asynchronous transfer mode multiplexor and the connectionless cell switching means are connected to one another directly by optical cables each having at least one virtual path set-up.

6. A connectionless communication system in accordance with claim 4, wherein the asynchronous transfer mode terminals, the asynchronous transfer mode hub, the asynchronous transfer mode multiplexor and the connectionless cell switching means are connected to one another directly by metal cables each having at least one virtual path set-up.

7. A connectionless communication system in accordance with claim 4, wherein a part of the terminal means are connected to corresponding ones of the connectionless cell switching means via virtual connections of an asynchronous transfer mode network, respectively, and the other part of the terminal means, the asynchronous transfer mode hub and the asynchronous transfer mode multiplexor are connected to corresponding ones of the connectionless cell switching means via optical cables, respectively.

8. A connectionless communication system in accordance with claim 4, wherein a part of the terminal means are connected to corresponding ones of the connectionless cell switching means via virtual connections of an asynchronous transfer mode network, respectively, and the other part of the terminal means, the asynchronous transfer mode hub and the asynchronous transfer mode multiplexor are connected to corresponding ones of the connectionless cell switching means via metal cables, respectively.

9. A connectionless communication method employed in a connectionless communication system including a plurality of terminal means each adapted to perform a function of converting a connectionless frame received from a network into a cell and reversely converting a cell into an original frame, request setup of a virtual connection when a frame is generated, and output the cell with a virtual channel identifier value indicative of the associated set-up virtual connection, and a plurality of connectionless data service means each adapted to set up the virtual connection at the request of the terminal means, transfer the set-up virtual channel identifier value to the terminal means which has requested the virtual connection setup, and perform a function of switching the cell transferred from the terminal means each of the connectionless data service means including connectionless cell switching means adapted to perform a cell switching function on the basis of a virtual channel identifier value of a connectionless cell upon receiving the cell from one of the terminal means, address processing means connected to one of ports of the connectionless cell switching means and adapted to provide a destination address and a mapping information about virtual path identifier values and virtual channel identifier values to the cell-transferring terminal means, and header translating means adapted to connect another one of the ports of the connectionless cell switching means to another connectionless data service means and translate virtual path identifier values and virtual channel identifier values, comprising the steps of:

(A) when a frame to be transferred is generated at one of the terminal means, transferring a search signal bearing a destination address value (DA) as a variable thereof to the address processing means of the connectionless data service means to which the terminal means generating the frame, namely, the transmitting-side terminal means is connected;

(B) when the destination address value (DA) sent to the address processing means at the step (A) corresponds to terminal means connected to the connectionless data service means associated with the transmitting-side terminal means, searching an address table by the transmitting-side address processing means to generate a virtual channel identifier value (VCI_i), and a search result signal (DA, VCI_i) resulting from the search to the transmitting-side terminal means;

(C) when the destination address value (DA) sent to the address processing means at the step (A) corresponds to a terminal connected to connectionless data service means other than that associated with the transmitting-side terminal means, searching a connection setup table allocated to a port of the connectionless cell switching means connected to the destination connectionless data service means via a virtual path, for an unused virtual channel (VCI_i) by the transmitting-side address processing means, and transferring a setup signal (DA, VCI_i) bearing the virtual channel (VCI_i) along with the destination address value (DA) received from the transmitting-side terminal as a variable thereof, to the header translating means of the destination connectionless data service means, namely, the receiving-side translating means;

(D) when the setup signal (DA, VCI_i) is received in the receiving-side header translating means at the step (C), transferring a search signal bearing the destination address value, namely, the variable of the setup signal (DA, VCI_i) to the address processing means of the destination connectionless data service means, namely, the receiving-side address processing means by the receiving-side header translating means;

(E) when the search signal is received in the receiving side address processing means at the step (D), searching an address table on the basis of the destination address value of the search signal by the receiving-side address processing means to generate a virtual channel identifier value (VCI_o) indicative of a path connected to the terminal means corresponding to the destination address value, and transferring a search result signal (DA, VCI_o) bearing the virtual channel identifier value (VCI_o) to the receiving-side header translating means;

(F) when the search result signal (DA, VCI_o) is received in the receiving-side header translating means at the step (E), storing the virtual channel identifier value (VCI_i) received from the transmitting-side address processing means and the virtual channel identifier value (VCI_o) received from the receiving-side address processing means in a mapping table by the receiving-side header translating means, and transferring a response signal to the transmitting-side address processing means to inform of a completion of the virtual connection setup between the connectionless data service means associated with the transmitting-side terminal and the destination connectionless data service means; and (G) when the response signal is received in the transmitting-side address processing means at the step (F), transferring the virtual channel identifier value (VCI_i) from the transmitting-side address processing means to the transmitting-side address processing means by use of the search result signal (DA, VCI_i) so that the virtual channel identifier value (VCI_I) is used for a cell transfer.

10. A connectionless communication method in accordance with claim 9, wherein if there is no unused virtual channel at the connection setup table search step of the step (C), the step (C) comprises the steps of releasing a part of virtual connections previously set-up and then allocating the virtual channel identifier value (VCI_i).

11. A connectionless communication method in accordance with claim 9, wherein if the mapping table has any region to store the virtual channel identifier values (VCI_i) and (VCI_o) no longer at the step (F), the step (F) comprises the steps of releasing a part of virtual connections previously set-up and then storing the virtual channel identifier values (VCI_i) and (VCI_o) in the mapping table.

* * * * *

UNITED STATES PATENT AND TRADEMARK OFFICE
CERTIFICATE OF CORRECTION

PATENT NO. : 5,548,589
DATED : August 20, 1996
INVENTOR(S) : BYUNG C. JEON ET AL.

It is certified that error appears in the above-indentified patent and that said Letters Patent is hereby corrected as shown below:

<u>On the Title Page</u>:

[73] Electronics and Telecommunications Research Institute, Seoul, Republic of Korea and Korea Telecommunication Authority, Seoul, Republic of Korea Signed and Sealed this Twenty-third Day of June, 1998

*Attest:*

BRUCE LEHMAN

*Attesting Officer*      *Commissioner of Patents and Trademarks*